June 30, 1936.  H. H. HARRIS  2,045,646
LINK BELT
Filed June 15, 1935  2 Sheets-Sheet 1
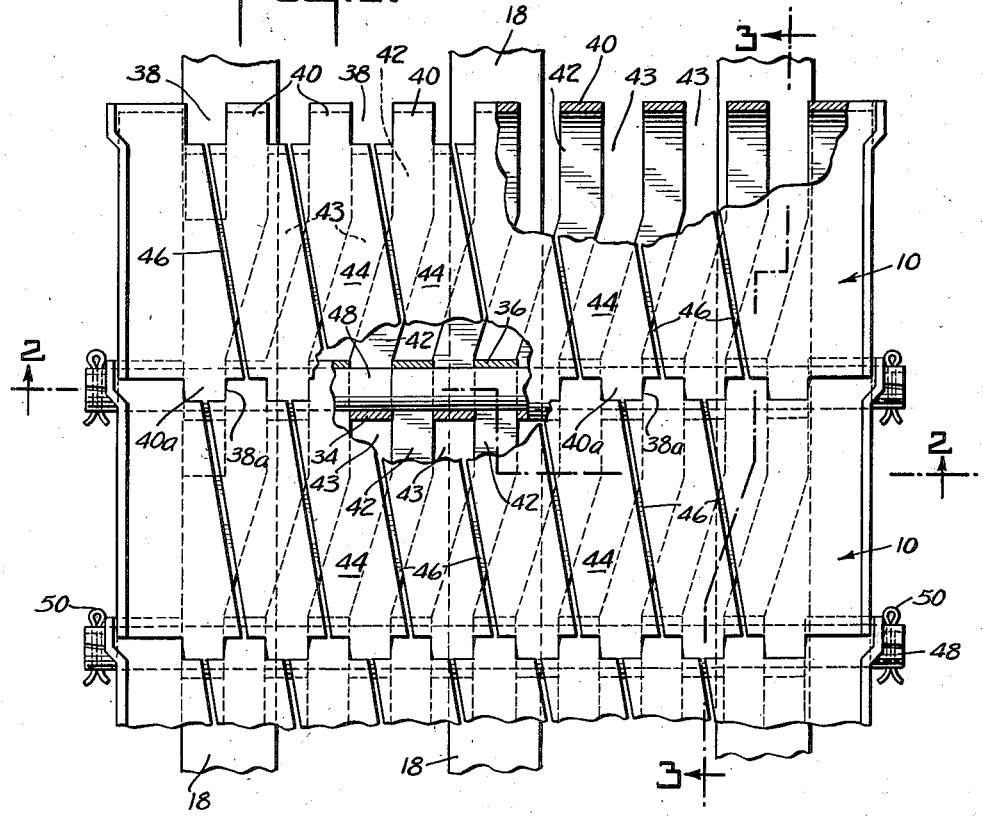
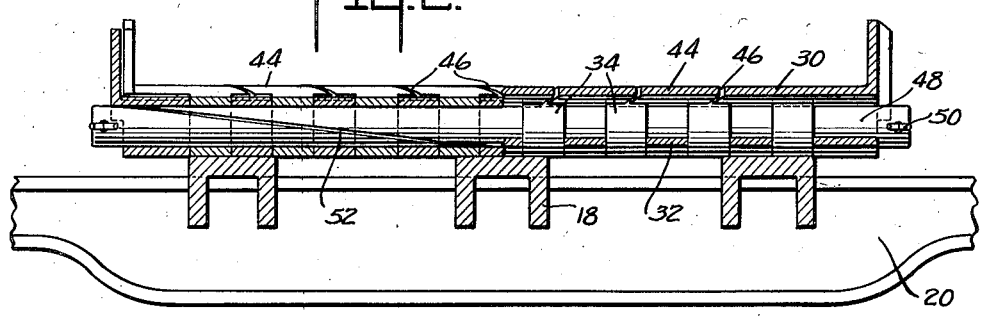
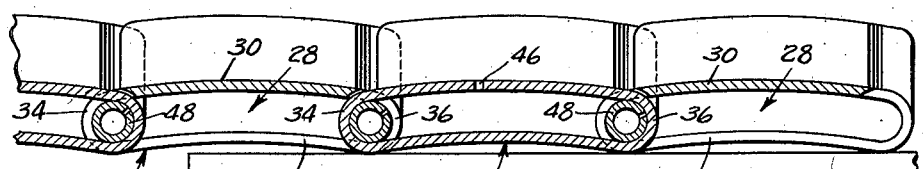
INVENTOR
Henry H. Harris
BY
ATTORNEYS June 30, 1936.  H. H. HARRIS  2,045,646
LINK BELT
Filed June 15, 1935   2 Sheets-Sheet 2

INVENTOR
Henry H. Harris
BY
ATTORNEYS

Patented June 30, 1936

2,045,646

UNITED STATES PATENT OFFICE 2,045,646

LINK BELT

Henry H. Harris, Champaign, Ill.

Application June 15, 1935, Serial No. 26,752

12 Claims. (Cl. 263—8)

My invention relates to belts for conveyor furnaces.

Among the objects of the invention is the provision of belts for use in conveyor furnaces, which are of sufficient width for supporting and travelling relatively wide pieces of work, such as carburizing boxes, for example, through the furnace, and which belts are made from single links, that is to say, the width of each of the individual links is equal to the width of the belt.

Another object consists in the provision of conveyor belt links for conveyor furnaces, which links are several times as wide as long, each link being formed to extend the entire width of the belt, and made up as a single openwork casting having plenty of strength to support the work being subjected to heat treatment, and each link provided with openings for permitting the heat to be supplied efficiently to the work by upward travel of furnace gases therethrough.

Another object of the invention is to provide a belt for conveyor furnaces having single links extending substantially the entire width of the belt, and with the links made up in spiral formation and the links so connected together in the belt that each link may be made from the same or an identical pattern.

Other objects will appear in connection with the following description of one form of conveyor belt embodying my invention.

In the accompanying drawings,

Fig. 1 is a plan view, with parts broken away, of a short section of conveyor furnace belt, and showing the arrangement for articulation of the successive lengths;

Fig. 2 is a transverse section on line 2—2, Fig. 1;

Fig. 3 is a longitudinal section on line 3—3, Fig. 1;

Figure 4:
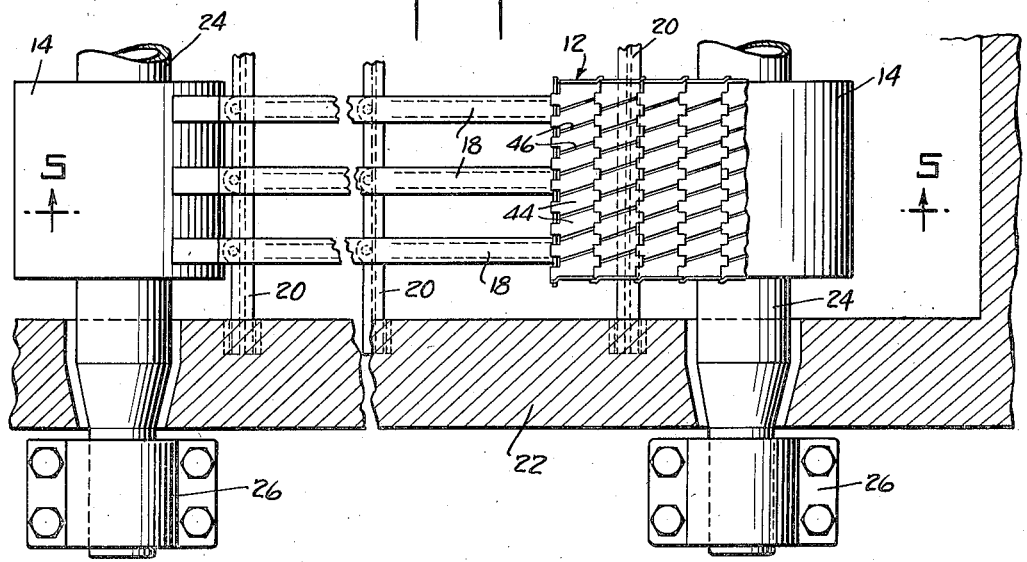
Fig. 4 is a plan view on reduced scale of the belt in use in the furnace.
Figure 5:
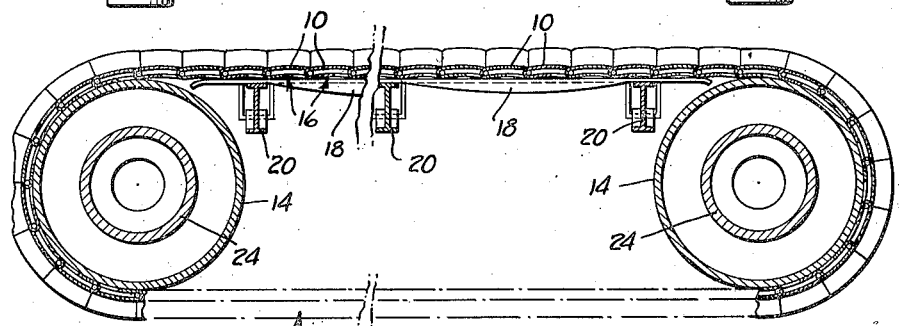
Fig. 5 is a longitudinal section on line 5—5, Fig. 4.

A conveyor belt link is indicated generally by reference character 10, and the belt 12, made up of links 10, runs on the wheels or pulleys 14, 14, the lower or inner portions of links 10 being concaved on their lower faces as indicated at 16 to fit the periphery of the pulleys 14. The upper lay of the belt 12 travels on tracks 18, 18, which are preferably of inverted channel formation, as shown in Fig. 2. Tracks 18, of which three are shown for each belt, are preferably spaced apart and rest upon spaced cross beams 20, which are supported in the side-walls 22 of the furnace. The shafts 24 of pulleys 14 preferably extend through openings provided therefor in the furnace side-wall, and are provided with bearings 26 outside of the side-walls. Said shaft 24 may be driven in any suitable manner (not shown).

The openwork arrangement of the cross beams 20 and the tracks 18 is adapted to permit ready upward travel of furnace gases and delivery of heat therethrough.

The links 10 are of generally tubular formation with a central opening 28, and comprise the upper part 30 and lower part 32 with substantially circular connecting portions 34, 36 at each end of the link, it being understood that the individual links are each several times as wide as long, the dimension of the link in the direction of travel of the belt being the length dimension, although same is much shorter than the width dimension of the belt.

Criss-cross passages are cut in the upper portion 30 and lower portion 32 of the link in such manner as to produce a substantial spiral formation. In the form shown the forward edge of each link 10 is made up of alternate notches 38 and lugs 40, and the rear edge of each link is made up of alternate lugs 40a and notches 38a, the preferable arrangement being such that a lug 40a comes opposite each notch 38 of that link, and a notch 38a opposite each lug 40. With such arrangement a single form of pattern is sufficient from which to cast all the links, the links being put together by insertion of the lugs of one link into the notches of the adjacent link, and link pins inserted.

The lower portion 32 of each link is cut into laterally inclined strips 42 by means of cutaway portions or passages 43, 43, connecting notches 38 at the forward edge of the link, with notches 38a in the opposite edge, which are laterally displaced to the left of the notches 38 when the link is viewed in plan as in Fig. 1.

The upper portion 30 of each link is sliced into strips 44 which are laterally inclined oppositely to the lateral inclination of strips 42 by means of the slits 46 cut therein and extending from a notch 38 in the forward edge of the link to the next notch 38a in the rear edge of the link, which is displaced to the right from the notch 38 when viewed in plan as in Fig. 1.

With the arrangement of strips and slits or cutaway portions as described, each of the substantially flat tubular links is of spiral formation, the spiral portions comprising the strips 42 in the lower portion 32 of the link, the connecting portion 36 extending about a lug as 40a, the upper or return strip 44 in the upper portion 30 of the link, and a rounded part 34 formed in a lug member 40. The links are readily assembled in the belt by introduction of lugs 40 into the notches 38a, and the connection completed by the insertion of the link pin 48 running the entire width of the belt and held in place by suitable means such as the cotter pins 50, one of which is preferably provided at each end.

Figure 6:
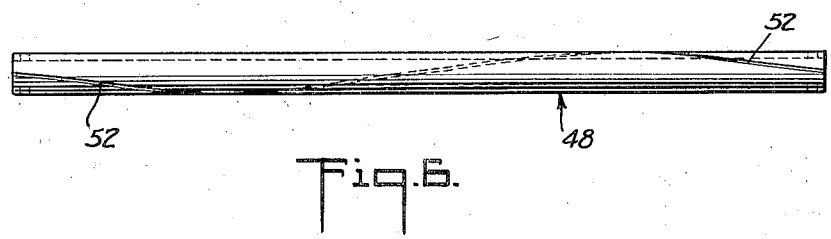
Fig. 6 is an elevation of a hollow link pin.

While the link pins may be simple solid rods, I prefer to use hollow pins 48 as indicated at Fig. 6, and when the said pins are cast as is the preferable instruction, the walls thereof are slitted in spiral formation as indicated at 52, Fig. 6, thereby providing for the expansion and contraction to take place under temperature changes without producing any substantial deformation of the pin member.

The passages 43 in the lower portion 32 of the link can be relatively wide inasmuch as the strips 42 of the inner portion 32 are not called upon to support any material weight in operation, thereby providing for efficient heat delivery through the lower part of the belt and right up to the upper part 30 thereof upon which the work directly rests. Passages 46 in the upper portion 30 of the belt are preferably relatively narrow so as to leave substantially maximum possible width and strengthen the intervening strips 44 which carry the work through the furnace and do not require extensive openings for the delivery of the heat to the work which is directly supported thereon.

It will be seen that the spirally formed link members have maximum strength in the upper portion thereof for supporting the work with sufficient passages for heat transfer while the lower portions of said spirals afford proper connections to complete the spiral formation and at the same time they can be relatively widely separated with large openings therebetween, permitting ready upward flow of the furnace gases through the lower parts of the belt links.

Conveyor furnace belts in accordance with the invention have many features of advantage: They are readily cast, a single form of casting pattern suffices for all the links of a belt, they require but a single casting for an entire complete link extending all the way across the belt, have plenty of strength to support the work, and at the same time have plenty of openwork provision for gas circulation to obtain an effective delivery of the heat to the work which is being conveyed through the furnace. It is to be understood that the illustrated embodiment is presented for affording an understanding of the invention and that modifications may be resorted to coming within the scope of my claims.

I claim:

1. A conveyor belt for conveyor furnaces comprising a series of links each the width of the belt, said links being generally tubular and comprising substantially spiral convolutions from side to side, and said links being notched to receive lugs pivoted in adjacent links, and pivot pins inserted through the interfitting lugs and notched parts.

2. A conveyor belt for conveyor furnaces comprising a series of links, each of which links is generally tubular and is identical in size and shape with every other link, the forward end of each link being adapted to interengage the rear end of the link in front thereof, and means to secure said links in the interengaged position.

3. Generally flat tubular link for belts of conveyor furnaces made up in spiral formation from side to side with the upper parts of the spirals relatively wide whereby heavy work can be submitted, and the lower parts thereof relatively narrow whereby effective heat delivery therethrough is obtained.

4. Substantially tubular link for belts of conveyor furnaces having arcuate lower and upper portions, the upper portions being sliced into spiral parts by narrow slices and the lower portions sliced into spiral parts by wider slices whereby to support loads on the upper portion, and permit heated gas travel through the lower portion.

5. In a conveyor belt furnace, spaced-apart tracks and belts running thereon, such belts comprising a series of generally tubular openwork links each extending substantially the full width of the belt, and said links having inter-engaging notches and lugs, and pivot pins passing through such interengaging portions.

6. A cast link for belts of conveyor belt furnaces comprising a generally flat tubular member having notches and lugs at the edges thereof which are adapted to interfit with similar lugs and notches on an adjacent link, and provided with laterally inclined passages extending from notches on one edge to laterally displaced notches on the opposite edge and producing a spiral formation extending from side to side of the link.

7. In a link for belts of conveyor belt furnaces, a tubular member subdivided into spiral formation by wide passages in the lower part and narrow passages in the upper part.

8. A cast tubular pivot pin for belts of conveyor furnaces, said pin being provided with a narrow twisted passage extending from the bore through the outer wall thereof whereby deformation on temperature change is minimized.

9. In a link for belts of conveyor belt furnaces, a generally tubular member deformed into substantial flatness and having upper and lower sides arcuate in shape and having a definite opening therebetween, said upper and lower sides being provided with openwork formations to allow passage of heat therethrough.

10. In a link for belts of conveyor belt furnaces, a generally tubular member deformed into substantial flatness and having upper and lower sides arcuately shaped with a definite opening therebetween, said upper and lower sides being provided with a plurality of substantially longitudinally extending openings whereby heat is readily passed through the lower side and the upper side is adapted to support heavy loads thereon.

11. A link as in claim 10 on which the longitudinally extending openings are greater on the lower than the upper side of the tubular link.

12. A link as in claim 10 on which the openings on the lower side are oblique with respect to the openings on the upper side of the tubular link whereby the link unit is substantially spirally shaped.

HENRY H. HARRIS.